United States Patent
Yin et al.

(10) Patent No.: US 12,346,265 B2
(45) Date of Patent: Jul. 1, 2025

(54) CACHE LINE RE-REFERENCE INTERVAL PREDICTION USING PHYSICAL PAGE ADDRESS

(71) Applicant: Advanced Micro Devices, Inc., Santa Clara, CA (US)

(72) Inventors: Jieming Yin, Bothell, WA (US); Yasuko Eckert, Redmond, WA (US); Subhash Sethumurugan, Minneapolis, MN (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/716,165

(22) Filed: Dec. 16, 2019

(65) Prior Publication Data

US 2021/0182213 A1    Jun. 17, 2021

(51) Int. Cl.
    *G06F 12/122*        (2016.01)
(52) U.S. Cl.
    CPC ............ *G06F 12/122* (2013.01); *G06F 2212/1021* (2013.01); *G06F 2212/1044* (2013.01)
(58) Field of Classification Search
    None
    See application file for complete search history.

(56) References Cited

U.S. PATENT DOCUMENTS

| | | | |
|---|---|---|---|
| 5,887,152 A | 3/1999 | Tran | |
| 6,023,747 A | 2/2000 | Dodson | |
| 6,101,595 A | 8/2000 | Pickett et al. | |
| 6,243,791 B1 | 6/2001 | Vondran, Jr. | |
| 6,349,365 B1 | 2/2002 | McBride | |
| 6,490,656 B1 | 12/2002 | Carlson | |
| 6,631,446 B1 * | 10/2003 | Cherkauer | G06F 12/122 711/134 |
| 6,678,795 B1 * | 1/2004 | Moreno | G06F 12/0862 711/146 |
| 6,732,238 B1 | 5/2004 | Evans et al. | |
| 6,823,427 B1 | 11/2004 | Sander et al. | |

(Continued)

OTHER PUBLICATIONS

International Search Report and Written Opinion in International Application No. PCT/US2008/010368, mailed Dec. 4, 2008, 10 pages.

(Continued)

*Primary Examiner* — Stephanie Wu
(74) *Attorney, Agent, or Firm* — Kowert, Hood, Munyon, Rankin & Goetzel, P.C.; Rory D. Rankin

(57) ABSTRACT

Systems, apparatuses, and methods for implementing cache line re-reference interval prediction using a physical page address are disclosed. When a cache line is accessed, a controller retrieves a re-reference interval counter value associated with the line. If the counter is less than a first threshold, then the address of the cache line is stored in a small re-use page buffer. If the counter is greater than a second threshold, then the address is stored in a large re-use page buffer. When a new cache line is inserted in the cache, if its address is stored in the small re-use page buffer, then the controller assigns a high priority to the line to cause it to remain in the cache to be re-used. If a match is found in the large re-use page buffer, then the controller assigns a low priority to the line to bias it towards eviction.

20 Claims, 6 Drawing Sheets

(56) References Cited

U.S. PATENT DOCUMENTS

| | | | | |
|---|---|---|---|---|
| 7,716,424 | B2* | 5/2010 | Franaszek | G06F 12/0897 |
| | | | | 711/137 |
| 7,861,041 | B2 | 12/2010 | Williams | |
| 2005/0223173 | A1 | 10/2005 | Yamazaki | |
| 2008/0222359 | A1* | 9/2008 | Ninomiya | G06F 12/0811 |
| | | | | 712/30 |
| 2011/0320762 | A1* | 12/2011 | Soares | G06F 12/0862 |
| | | | | 711/207 |
| 2016/0062916 | A1* | 3/2016 | Das | G06F 12/1027 |
| | | | | 711/133 |
| 2016/0232093 | A1* | 8/2016 | Kim | G06F 12/0862 |
| 2016/0259689 | A1* | 9/2016 | Mukherjee | G06F 11/1402 |
| 2017/0235681 | A1* | 8/2017 | Kaburaki | G06F 12/0292 |
| | | | | 711/128 |
| 2017/0293565 | A1* | 10/2017 | Priyadarshi | G06F 12/0888 |
| 2017/0293571 | A1* | 10/2017 | Al Sheikh | G06F 12/123 |
| 2017/0357585 | A1* | 12/2017 | Moyer | G06F 12/126 |
| 2019/0065384 | A1* | 2/2019 | Al Sheikh | G06F 12/0875 |
| 2019/0102272 | A1* | 4/2019 | Ramrakhyani | G06F 9/383 |
| 2019/0155750 | A1* | 5/2019 | Wang | G06F 12/0811 |
| 2019/0235762 | A1* | 8/2019 | Kaburaki | G06F 12/0864 |
| 2020/0117608 | A1* | 4/2020 | Thompto | G06F 12/0871 |
| 2020/0293450 | A1* | 9/2020 | Vemulapalli | G06F 12/0897 |

OTHER PUBLICATIONS

Jaleel et al., "High Performance Cache Replacement Using Re-Reference Interval Prediction (RRIP)", Proceedings of the 37th Annual International Symposium on Computer Architecture, Jun. 2010, 12 pages.

"Replacement Algorithm for a Fully Associative Cache", IBM Technical Disclosure Bulletin, IBM Corporation, Jan. 1, 1998, pp. 123-124, vol. 41, No. 1.

Soundararajan, Gokul, "Implementing a Better Cache Replacement Algorithm in Apache Derby Progress Report", Aug. 19, 2006, 6 pages, https://pdfs.semanticscholar.org/220b/2fe62f13478f1ec75cf17ad085874689c604.pdf.

Wezenbeek, et al; "A Survey of Memory Management", Microprocessing and Microprogramming, May 1, 1993, pp. 141-162, vol. 36, No. 3.

* cited by examiner

CACHE LINE RE-REFERENCE INTERVAL PREDICTION USING PHYSICAL PAGE ADDRESS

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

Computer systems use main memory that is typically formed with inexpensive and high density dynamic random access memory (DRAM) chips. However, DRAM chips suffer from relatively long access times. To improve performance, data processors typically include at least one local, high-speed memory known as a cache. The cache stores blocks of data that are frequently accessed by the processor. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block varies according to design choice, and can be of any size. In addition, each of the terms "cache tag", "cache line tag", and "cache block tag" is interchangeable.

As caches have limited storage capacity, a cache management policy determines which cache lines are selected for replacement when a corresponding region of the cache is full. However, some conventional cache management policies, such as those based on least recently used (LRU) principles, are less efficient when dealing with irregular accesses to cache lines, or require relatively complex circuitry implementations that can limit their applicability.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing cache line re-reference interval prediction using a physical page address are disclosed herein. In one implementation, a processor includes at least a cache and a cache controller. The cache controller tracks the re-reference intervals for cache lines of representative sets of the cache. When a cache line is accessed, the cache controller retrieves a counter value associated with the cache line, where the counter value tracks the re-reference interval for the cache line. If the re-reference interval is less than a first threshold, then the physical page number (or a portion of the physical page number) of the cache line is stored in a "small re-use page buffer" (i.e., a page buffer corresponding to a relatively small(er) re-use interval). On the other hand, if the re-reference interval is greater than a second threshold, then the physical page number (or a portion thereof) of the cache line is stored in a "large re-use page buffer" (i.e., a page buffer corresponding to a relatively larg(er) re-use interval). When a new cache line is inserted in the cache, if the physical page address of the new cache line is stored in the small re-use page buffer, then the cache controller assigns a priority to the new cache line which will cause the new cache line to remain in the cache to be given the opportunity of being re-used. If the physical page address of the new cache line is stored in the large re-use page buffer, the cache controller assigns a priority to the new cache line to bias the new cache line towards eviction. Depending on the implementation, a portion or the entirety of the physical page number is stored in the small or large re-use page buffer. For example, if the physical page number is 36 bits, then 24 bits (or some other number of bits) of the physical page number can be stored in either buffer to reduce the hardware cost. These and other embodiments are possible and are contemplated.

Figure 1:
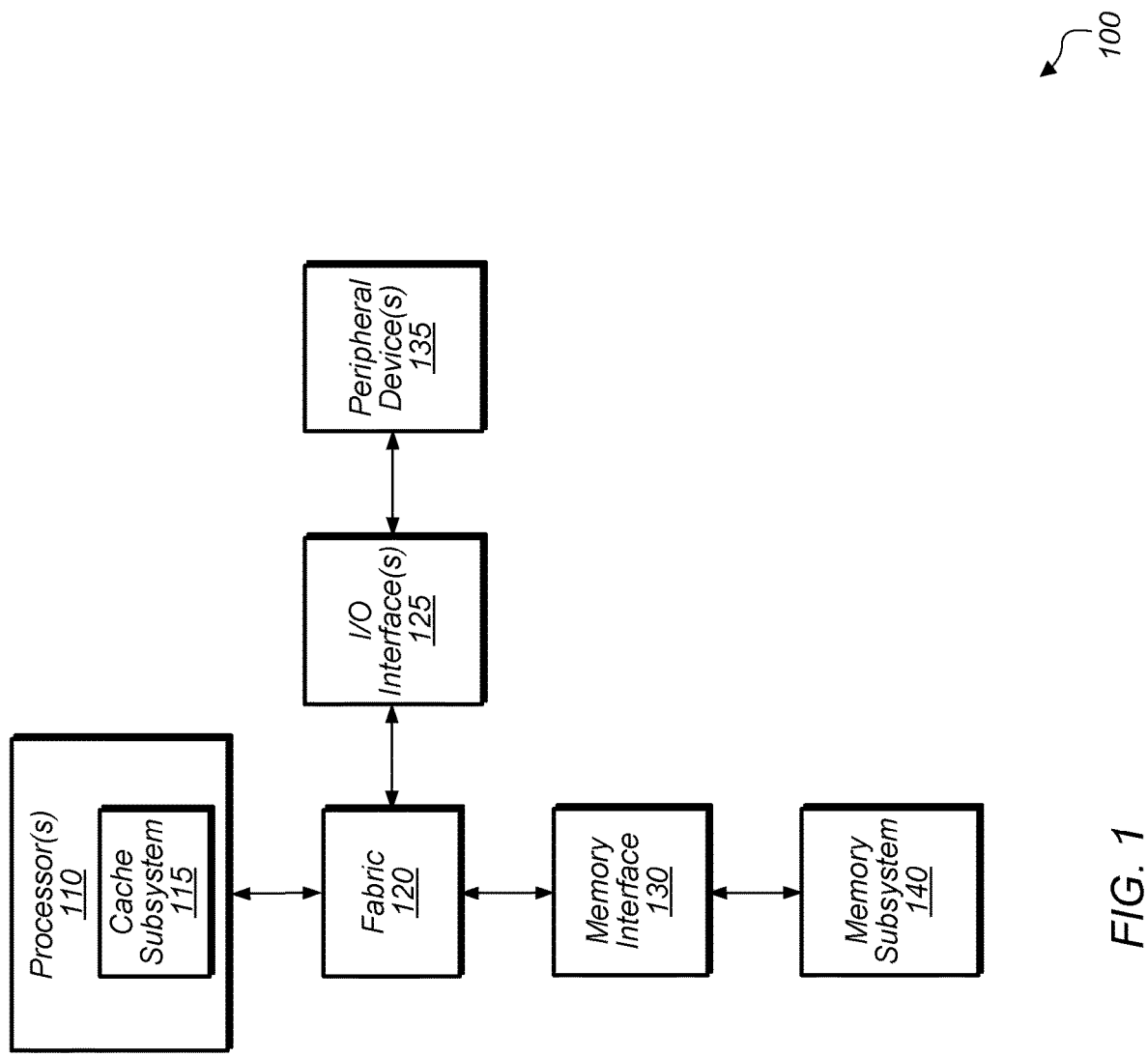
FIG. 1 is a block diagram of one implementation of a computing system.

Referring now to FIG. 1, a block diagram of one implementation of a computing system 100 is shown. In one implementation, computing system 100 includes at least processor(s) 110, fabric 120, input/output (I/O) interface(s) 125, memory interface 130, peripheral device(s) 135, and memory subsystem 140. In other implementations, computing system 100 can include other components, computing system 100 can omit an illustrated component, and/or computing system 100 can be arranged differently. In one implementation, each processor 110 includes a cache subsystem 115. Cache subsystem 115 has any number of cache levels with any of various types of caches which can vary according to the implementation. In some cases, one or more caches in the cache hierarchy of cache subsystem 115 can be located in other locations external to processor(s) 110. In one implementation, one or more caches of cache subsystem 115 employ cache line re-reference interval prediction based on the physical page address of the cache line. More details on the techniques used for predicting a cache line re-reference interval based on the physical page address of the cache line will be provided throughout the remainder of this disclosure.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). Memory subsystem 140 includes any number and type of memory devices. For example, the type of memory in memory subsystem 140 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. I/O interface(s) 125 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral device(s) 135 can be coupled to I/O interface(s) 125. Such peripheral device(s) 135 include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more of a given component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
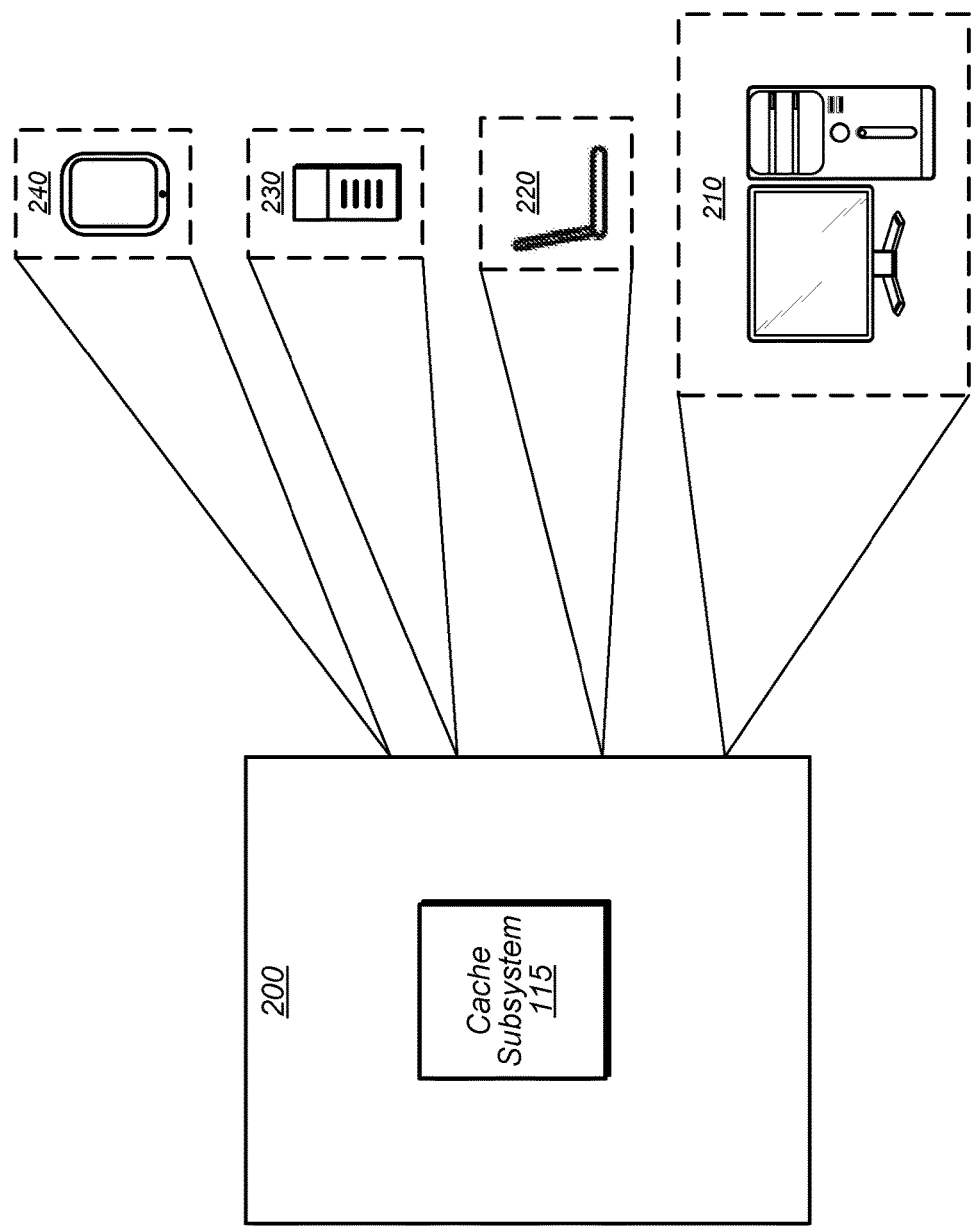
FIG. 2 is a block diagram of one implementation of a computing system.

Turning now to FIG. 2, a block diagram of one implementation of a computing system 200 is shown. As shown, system 200 represents chip, circuitry, components, etc., of a desktop computer 210, laptop computer 220, server 230, mobile device 240, or otherwise. Other devices are possible and are contemplated. In the illustrated implementation, the system 200 includes at least one instance of cache subsystem 115 (of FIG. 1). Although not shown in FIG. 2, system 200 can also include any number and type of other components, such as one or more processors, one or more memory devices, one or more peripheral devices, and so on. Cache subsystem 115 includes any number of cache levels which employ cache line re-reference interval prediction based on the physical page address of the cache line. More details regarding cache line re-reference interval prediction based on the physical page address of the cache line will be provided throughout the remainder of this disclosure.

Figure 3:
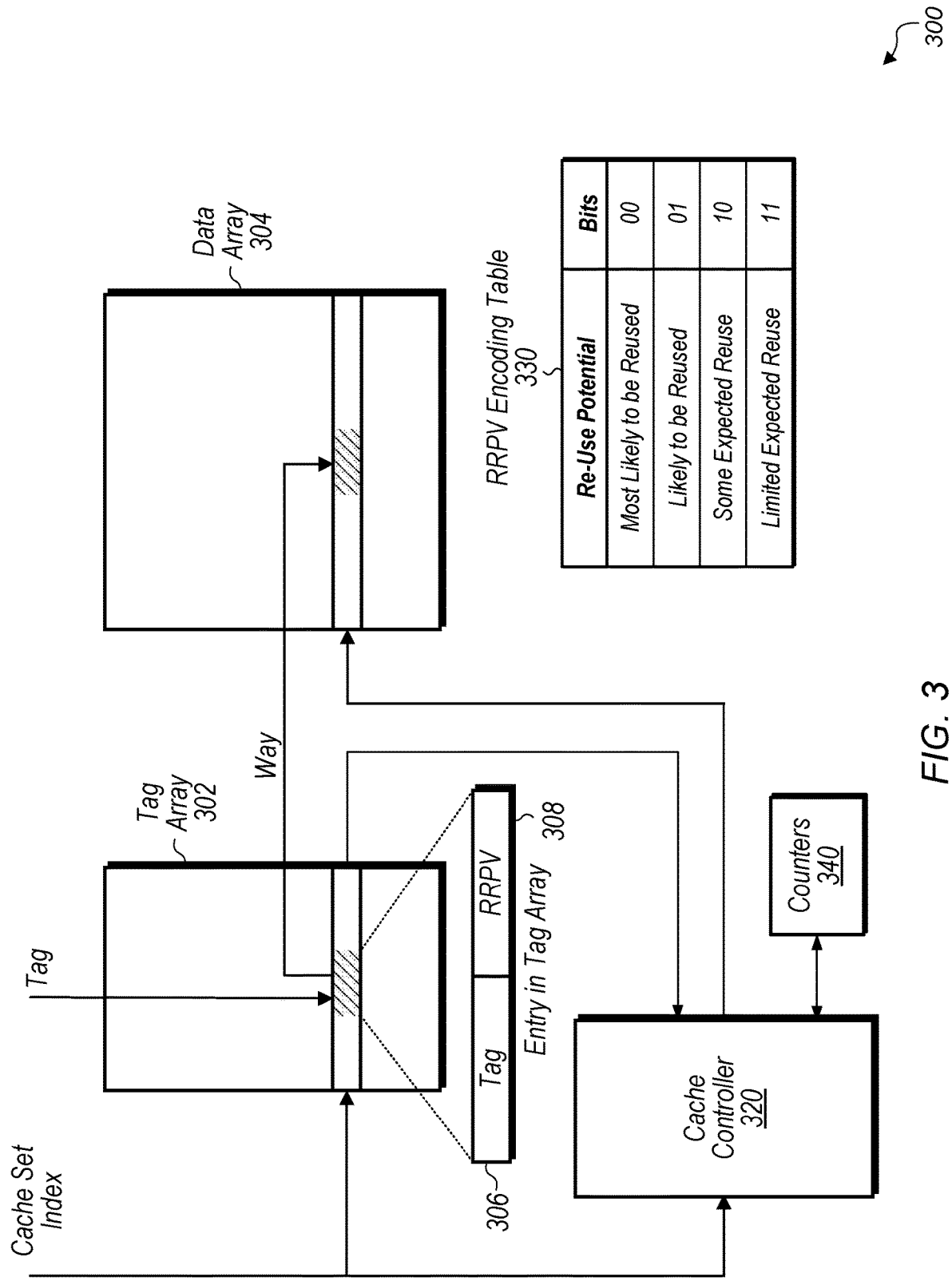
FIG. 3 is a block diagram of one implementation of a cache employing a re-reference interval predictor based on a physical page address.

Referring now to FIG. 3, a block diagram of one implementation of a cache 300 employing a re-reference interval predictor based on a physical page address is shown. In various implementations, cache 300 is a low latency, high bandwidth memory separate from system memory. In some implementations, cache 300 is used as a last-level cache in a cache memory subsystem (e.g., cache subsystem 115 of FIG. 1). In other implementations, cache 300 is another level within the cache memory subsystem.

When a read or write request is received by cache 300, a lookup of tag array 302 is performed using the tag of the address targeted by the request. If the lookup misses and a cache line will be allocated for the request, then cache controller 320 determines which cache line to evict so as to be able to store the new cache line. It is noted that cache controller 320 can also be referred to as control logic. In one implementation, cache controller 320 uses the re-reference prediction value (RRPV) 308 stored in each entry in tag array 306 in the corresponding set of tag array 302 to determine which cache line to evict from data array 304.

For set-associative cache structures, when a cache line is allocated in cache 300, cache controller 320 stores a tag, RRPV 308, and metadata (not shown) in an entry 306 of tag array 302 in a set which is referenced by the cache set index. Also, when allocating the cache line in cache 300, in one implementation, cache controller 320 sets the RRPV value to a value based on the likelihood of the cache line being accessed again within a given interval of time. One example of RRPV encodings that can be used in accordance with one implementation are shown in RRPV encoding table 330. For bits "00", this indicates that the cache line is most likely to be reused and this cache line has the highest priority and will be the last cache line chosen for eviction by cache controller 320. For bits "01", this indicates that the cache line is likely to be reused and this cache line has the second highest priority. For cache lines with an RRPV of "01", these cache lines will only be chosen for eviction if the other cache lines have an RRPV of "00".

For bits "10", this indicates that the cache line has some expected reuse and this cache line has the second lowest priority and will be chosen for eviction by cache controller 320 if no lines with an RRPV of "11" are found. For bits "11", this indicates that the cache line has limited expected reuse and this cache line has the lowest priority. Cache controller 320 will attempt to find a cache line with an RRPV of "11" when an eviction is required. In other implementations, the RRPV field 308 of the entry in tag array 302 can have other numbers of bits besides two. Also, in other implementations, other encodings can be used different from the ones shown in RRPV encoding table 330.

In one implementation, on a cache hit, the RRPV field 308 of the cache line that was accessed is set to zero. On a cache miss, a cache line with a RRPV of three (i.e., bits "11") is selected to be the victim. If a cache line with a RRPV of three is not found, the RRPV fields of all cache lines are incremented until a cache line with a RRPV of three is found. In one implementation, cache lines that are more likely to be re-used are assigned an initial RRPV of zero, allowing these cache lines to have more time to be re-used. Cache lines with limited expected reuse are assigned an initial RRPV of three to bias these cache lines towards eviction. In this implementation, other cache lines are assigned a default initial RRPV of two. Cache lines with small and large re-use distances (amounts of time between accesses) are identified by cache controller 320 based on re-use distances associated with previous accesses to the same physical pages as will be described in the discussion associated with FIG. 4.

In one implementation, cache 300 includes counters 340 for calculating the current re-use distances of cache lines and for determining replacement priorities for cache lines stored in data array 304. It is noted that the terms "re-use distance" and "re-reference interval" can be used interchangeably herein. In one implementation, counters 340 include a set access counter and a line access counter for each way of a set for any number of sets of cache 300. In one implementation, the sets that are tracked by counters 340 are representative cache sets of cache 300 for sampling purposes. Each set access counter of counters 340 stores a set access count value that represents the number of times an access has occurred to the set since the corresponding cache line was inserted or last accessed. Each line access counter stores a line access count value that represents the number of times the corresponding cache line has been accessed since being inserted into cache 300 or since being reset in response to the start of a next calculation cycle. A discussion of using counters to calculate the current reuse distances of cache lines and for determining replacement priorities for cache lines will continue in the subsequent discussion of FIG. 4.

Figure 4:
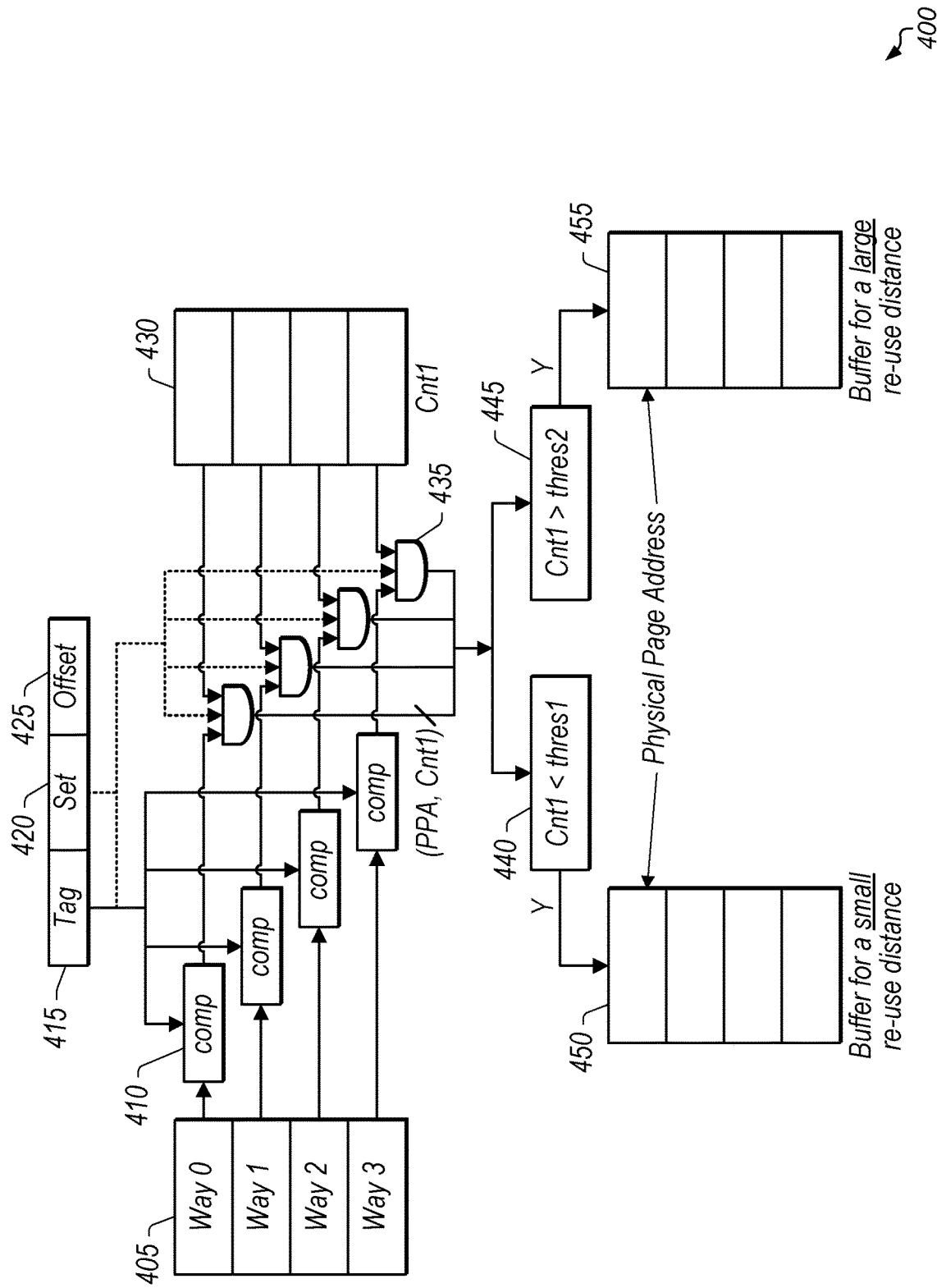
FIG. 4 is a block diagram of one implementation of predicting a cache line re-reference interval based on the physical page address of the cache line.

Turning now to FIG. 4, a block diagram of one implementation of predicting a cache line re-reference interval based on the physical page address of the cache line for cache 400 is shown. The components of cache 400 illustrate the circuitry that can be used in one implementation for tracking the re-reference interval of cache lines, tracking physical pages that have relatively high re-reference intervals, and tracking physical pages that have relatively low re-reference intervals. When a lookup is performed of cache 400 for a given address, the tag 415, set 420, and offset 425 portions of the given address are used to access the various structures as shown in the diagram of FIG. 4. The tag portion 415 of the address is compared by comparators 410 to the tags stored in ways 405. In the illustrated example, cache 400 includes four ways 405 (way 0 to way 3), but more or fewer ways can be implemented in other caches.

If a match is found in one of the ways 405 for the tag portion 415 of the address, then the re-reference interval (Cnt1) is retrieved from the corresponding counter 430. The physical page address (PPA) (or a portion thereof) and the re-reference interval are provided to comparison blocks 440 and 445. If the re-reference interval is less than a first threshold (thres1), then the physical page address (or a portion thereof) is stored in buffer 450 for pages with a small re-use distance. If the re-reference interval is greater than a second threshold (thres2), then the physical page address portion is stored in buffer 455 for pages with a large re-use distance. Otherwise, if the re-reference interval falls somewhere in between the first threshold and the second threshold, then the physical page address portion is not stored in either of buffers 450 and 455.

It should be understood that while two buffers 450 and 455 are included for cache 400, this is merely indicative of one implementation. In other implementations, other numbers of buffers besides two can be employed to track other numbers of pages with different re-use distances. For example, in another implementation, four buffers can be used for very small re-use distance pages, small re-use distance pages, large re-use distance page, and very large re-use distance pages. Other implementations can have other numbers of buffers to track the re-use distance of pages at other granularity levels.

Figure 5:
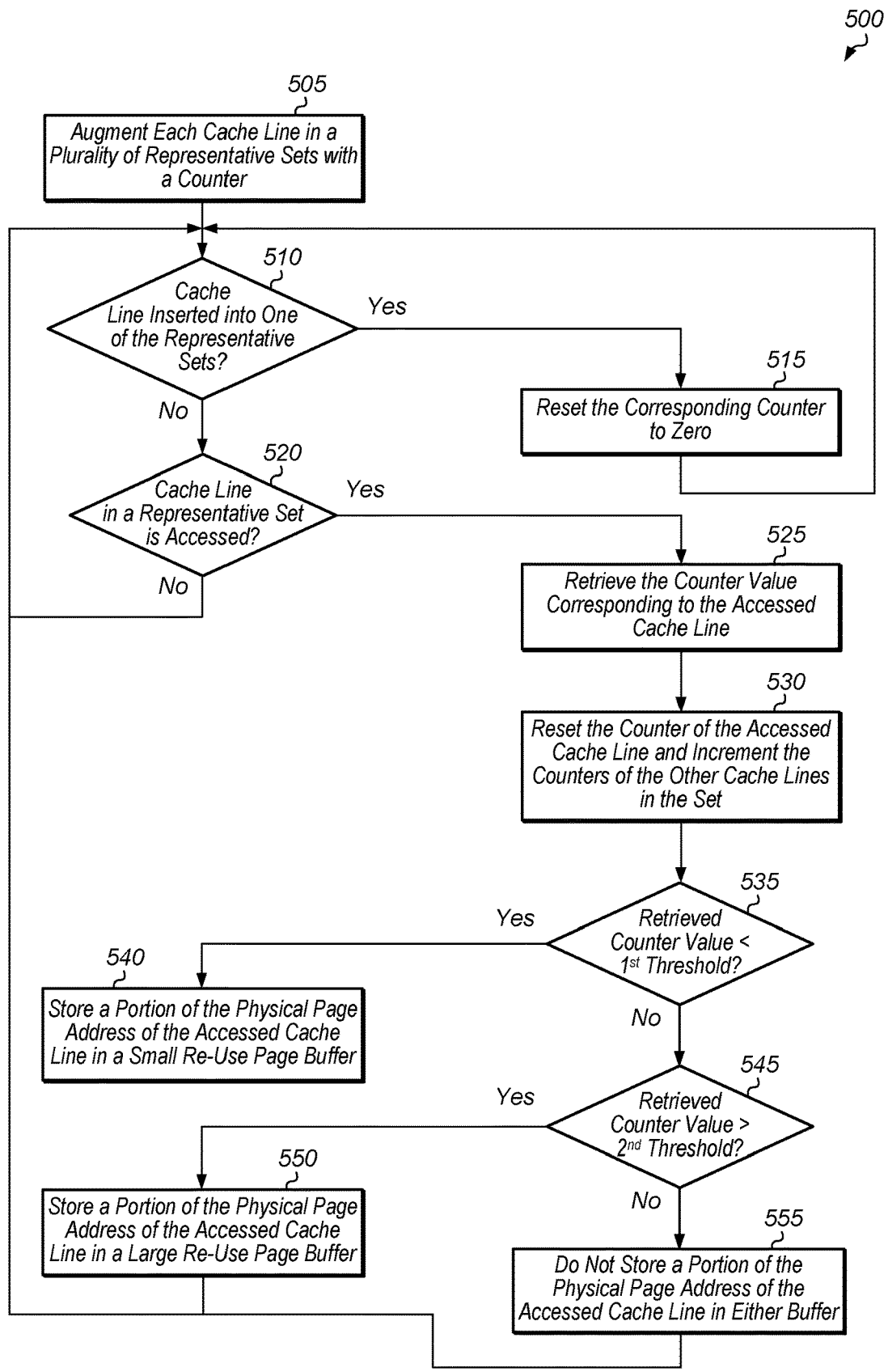
FIG. 5 is a generalized flow diagram illustrating one implementation of a method for computing the re-use distance for cache lines of representative sets.
Figure 6:
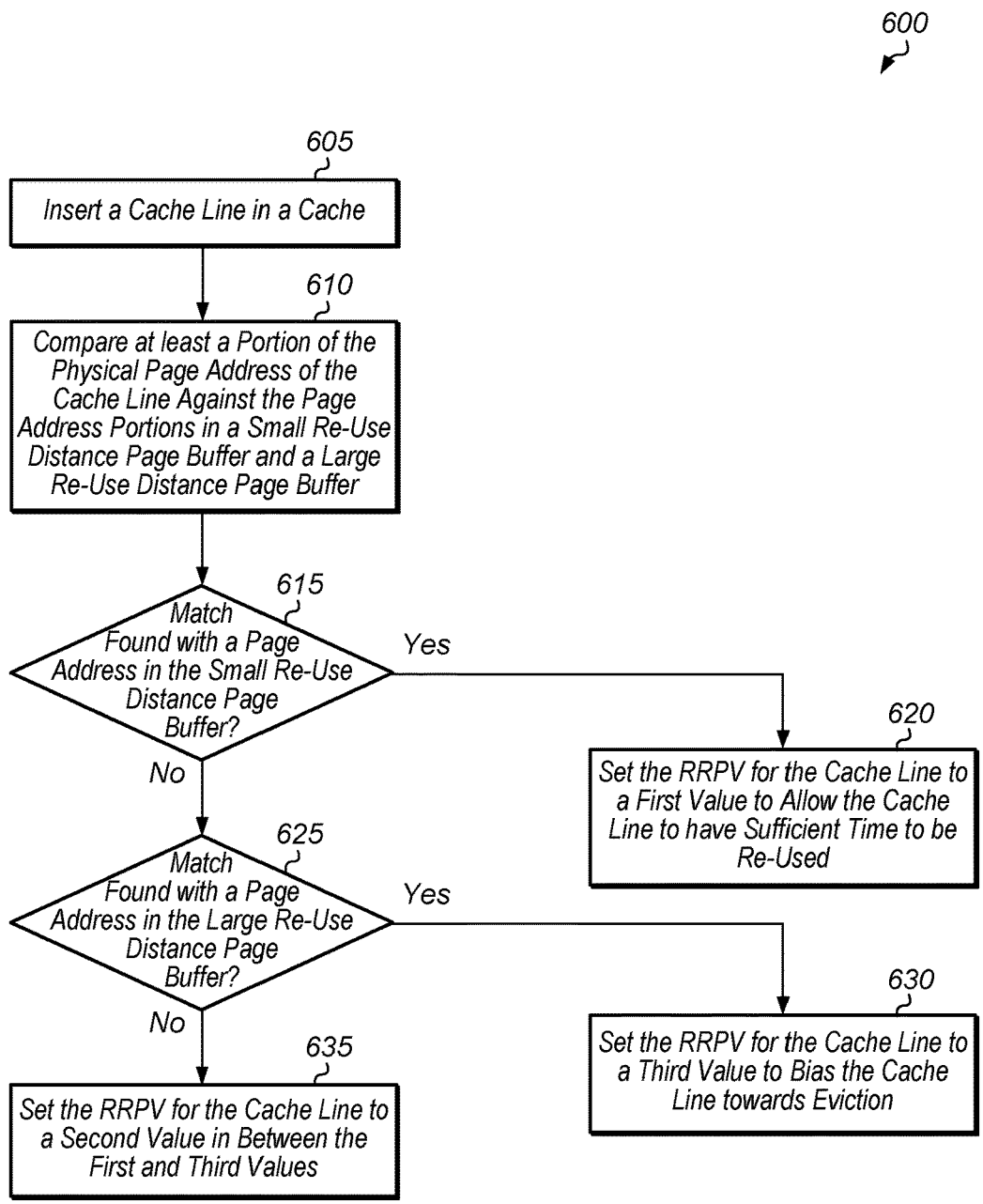
FIG. 6 is a generalized flow diagram illustrating one implementation of a method for using a physical page address to determine a re-reference prediction value for a cache line.

Referring now to FIG. 5, one implementation of a method 500 for computing the re-use distance for cache lines of representative sets is shown. For purposes of discussion, the steps in this implementation and those of FIG. 6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

Each cache line in a plurality of representative sets is augmented with a counter (block 505). When a cache line is inserted into one of the representative sets (conditional block 510, "yes" leg), then the corresponding counter is reset to zero (block 515). When a cache line of one of the representative sets is accessed (conditional block 520, "yes" leg), the counter value corresponding to the accessed cache line is retrieved (block 525). Then, the counter of the accessed cache line is reset and the other cache lines in the set have their counters incremented by one (block 530).

If the retrieved counter value of the accessed cache line is less than a first threshold (conditional block 535, "yes" leg), then a portion of the physical page address of the accessed cache line is stored in a small re-use page buffer (block 540). On the other hand, if the retrieved counter value of the accessed cache line is greater than a second threshold (conditional block 545, "yes" leg), then a portion of the physical page address of the accessed cache line is stored in a large re-use page buffer (block 550). Otherwise, if the counter value of the accessed cache line is in between the first and second thresholds (conditional blocks 535 and 545, "no" legs), then a portion of the physical page address of the accessed cache line is not stored in either page buffer (block 555). After blocks 540, 550, and 555, method 500 returns to conditional block 510. The small re-use page buffer and the large re-use page buffer are used to identify cache lines that are predicted to have relatively small re-use distances and relatively large re-use distances, respectively.

Turning now to FIG. 6, one implementation of a method 600 for using a physical page address to determine a re-reference prediction value for a cache line is shown. A cache line is inserted in a cache (block 605). At least a portion of the physical page address of the cache line is compared against the page address portions in a small re-use distance page buffer and a large re-use distance page buffer (block 610). In other implementations, the portion of the physical page address of the cache line is compared against the page address portions in other numbers of buffers besides two.

If a match is found with a physical page address portion stored in the small re-use distance page buffer (conditional block 615, "yes" leg), then the re-reference prediction value (RRPV) for the cache line is set to a first value to allow the cache line to have sufficient time to be re-used (block 620). In one implementation, the first value is 0. Otherwise, if there is no match with any of the page address portions stored in the small re-use distance page buffer (conditional block 615, "no" leg), then if a match is found with a page address portion stored in the large re-use distance page buffer (conditional block 625, "yes" leg), then the RRPV for the cache line is set to a third value to bias the cache line towards eviction (block 630). In one implementation, the third value is 3 when a 2-bit register is used to store the RRPV. Otherwise, if there is no match with any of the page address portions stored in the large re-use distance page buffer (conditional block 625, "no" leg), then the RRPV for the cache line is set to a second value in between the first and third values (block 635). In one implementation, the second value is 2 when a 2-bit register is used to store the RRPV. After blocks 620, 630, and 635, method 600 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a cache configured to store a plurality of cache lines; and
a cache controller; wherein responsive to allocating an entry in the cache for a first cache line corresponding to a page, the cache controller comprises circuitry configured to:
store the first cache line in the cache; and
set a re-reference prediction value (RRPV) for the first cache line to an initial value, wherein the initial value is based at least in part on a previous access to a second cache line that corresponds to the page, wherein the RRPV for the first cache line is distinct from an RRPV of the second cache line.

2. The processor as recited in claim 1, wherein the cache controller is configured to:
set the initial value equal to a first value in further response to finding an identification of the page in a first re-use distance page buffer.

3. The processor as recited in claim 2, the cache controller is configured to:
set the initial value equal to a second value different from the first value, responsive to the identification of the page:
not being found in the first re-use distance page buffer; and
being found in a second re-use distance page buffer.

4. The processor as recited in claim 3, wherein the cache controller is configured to set the initial value equal to a third value responsive to not finding the identification of the page in either the second re-use distance page buffer or the first re-use distance page buffer, wherein the third value is different from the first value and the second value.

5. The processor as recited in claim 1, wherein the cache controller is further configured to prioritize evicting a second cache line over a first cache line based on a first value and a second value stored in re-reference prediction value fields corresponding to the first cache line and second cache line, respectively, wherein the re-reference prediction value indicates a likelihood of a cache line being accessed within an interval of time.

6. The processor as recited in claim 1, wherein the RRPV of the first cache line comprises a count.

7. The processor as recited in claim 1, wherein responsive to an access to a given cache line stored in the cache, the cache controller is configured to:
retrieve an RRPV that corresponds to the given cache line;
store an identification of a given page that corresponding to the given cache line:
in a first re-use distance page buffer, responsive to the RRPV being less than a first threshold; and
in a second re-use distance page buffer different from the first re-use distance page buffer, responsive to the RRPV being greater than a second threshold.

8. A method comprising:
allocating an entry in a cache for a first cache line corresponding to a page;
responsive to allocating the entry:
storing the first cache line in the cache; and
setting a re-reference prediction value (RRPV) for the first cache line to an initial value, wherein the initial value is based at least in part on a previous access to a second cache line that corresponds to the page, wherein the RRPV for the first cache line is distinct from an RRPV of the second cache line.

9. The method as recited in claim 8, further comprising setting the initial value equal to a first value in further response to finding an identification of the page in a first re-use distance page buffer.

10. The method as recited in claim 9, wherein the method further comprises setting the initial value equal to a second value responsive to an identification of the page:
not being found in the first re-use distance page buffer; and
being found in a second re-use distance page buffer.

11. The method as recited in claim 10, comprising setting the RRPV of the first cache line equal to a third value responsive to the identification of the page not being found in either the second re-use distance page buffer or the first re-use distance page buffer, wherein the third value is different from the first value and the second value.

12. The method as recited in claim 8, further comprising prioritizing evicting a second cache line when making a cache replacement decision rather than evicting a first cache line based on a first value and a second value stored in re-reference prediction value fields corresponding to the first cache line and second cache line, respectively, wherein the re-reference prediction value indicates a likelihood of a cache line being accessed within an interval of time.

13. The method as recited in claim 8, wherein the RRPV of the first cache line comprises a count.

14. The method as recited in claim 8, responsive to an access to a given cache line stored in the cache, the method further comprises:
retrieving an RRPV that corresponds to the given cache line;
storing an identification of a given page corresponding to the given cache line:
in a first re-use distance page buffer, responsive to the retrieved RRPV being less than a first threshold; and
in a second re-use distance page buffer different from the first re-use distance page buffer, responsive to the retrieved RRPV being greater than a second threshold.

15. A system comprising:
a cache comprising circuitry, wherein responsive to allocating an entry for a first cache line corresponding to a page, the cache is configured to:
store the first cache line in the cache; and
set a re-reference prediction value (RRPV) for the first cache line to an initial value, wherein the initial value is based at least in part on a previous access to a second cache line that corresponds to the page, wherein the RRPV for the first cache line is distinct from an RRPV of the second cache line.

16. The system as recited in claim 15, wherein the cache is further configured to:
set the initial value equal to a first value further response to finding an identification of the page in a first re-use distance page buffer.

17. The system as recited in claim 16, wherein the cache is further configured to:
set the initial value equal to a second value different from the first value, responsive to the identification of the page:
not being found in the first re-use distance page buffer; and
being found in a second re-use distance page buffer.

18. The system as recited in claim 17, wherein the cache is further configured to set the initial value equal to a third value responsive to not finding the identification of the page in either the second re-use distance page buffer or the first re-use distance page buffer, wherein the third value is different from the first value and the second value.

19. The system as recited in claim 16, wherein the cache is configured to prioritize evicting a second cache line when making a cache replacement decision rather than evicting the first cache line based on the first value and a second value stored in re-reference prediction value (RRPV) fields corresponding to the first cache line and second cache line, respectively.

20. The system as recited in claim 15, wherein the RRPV of the first cache line comprises a count.

\* \* \* \* \*